United States Patent [19]
Durin

[11] 3,834,236
[45] Sept. 10, 1974

[54] DEVICE FOR MEASURING LIQUID LEVEL AND AIR PUMP FOR USE THEREIN

[75] Inventor: Michel Durin, Paris, France

[73] Assignee: Societe Anonyme Automobiles Citroen, Paris, France

[22] Filed: Jan. 26, 1973

[21] Appl. No.: 327,224

[30] Foreign Application Priority Data
Jan. 25, 1972 France.............................. 72.2332

[52] U.S. Cl.................................. 73/302, 417/571
[51] Int. Cl........................................... G01f 23/16
[58] Field of Search...... 73/302, 392; 417/571, 569, 417/560

[56] References Cited
UNITED STATES PATENTS
1,486,133  10/1949  Egger.................................. 73/392
1,758,077  5/1930  Fentress.............................. 73/302

FOREIGN PATENTS OR APPLICATIONS
802,109  10/1958  Great Britain..................... 417/571

Primary Examiner—Richard C. Queisser
Assistant Examiner—Denis E. Corr
Attorney, Agent, or Firm—Brisebois & Kruger

[57] ABSTRACT

Air pump comprises a first, constant volume chamber having an outlet, a vent to atmosphere, and an inlet connecting it to a second variable volume chamber, the volume of which is controlled by a flexible membrane. Operating means are provided for simultaneously actuating the membrane to reduce the volume of the second chamber and closing said vent so that air is expelled from the second chamber through the first chamber and its outlet, preferably into the pneumatic circuit of a manometric system for measuring the level of liquid in a container, e.g., the level of oil in the crankcase of a motor.

9 Claims, 4 Drawing Figures

PATENTED SEP 10 1974        3,834,236

3,834,236

DEVICE FOR MEASURING LIQUID LEVEL AND AIR PUMP FOR USE THEREIN

SUMMARY OF THE INVENTION

This invention relates to a device for measuring the level of a liquid in a reservoir from a distant point and to an air pump for use with this device. The apparatus according to the invention is of the type comprising an elastic, extensible membrane which drives the air through a calibrated orifice into a pneumatic circuit connected to a manometric measuring tube and into a tube having an open end descending into a liquid, the level of which is to be measured.

The air under pressure drives the liquid from the descending tube and is evacuated until the pressure in the pneumatic circuit corresponds to the height of the liquid above the end of the tube. The manometric tube indicating the pressure in the circuit therefore provides a direct measure of the liquid level.

The principal object of the invention is to resolve the problem posed by the adaptation of such a device to a vehicle, especially when used to gauge the level of the oil in a tank or in the crankcase of an engine.

The apparatus according to the invention is characterized by the fact that it comprises a first variable volume chamber connected only through the calibrated orifice to a second constant volume chamber provided with a valve connecting said chamber to the atmosphere and actuated through a friction drive by the device for operating the pump, said second chamber being connected to the pneumatic circuit.

This produces a substantially constant supply of air, which assures a measurement which is independent of the speed of operation of the pump, and an immediate connection of the measuring circuit to the ambient atmosphere once the pump operating means is released, which connection to atmosphere is interrupted when the pump operating means is again actuated.

This avoids sucking up the measuring liquid in the manometric tube and resets the indicator to zero when the measurement has been completed. This last point is very important on an automotive vehicle because the driver always has the measuring instrument in sight and a slow drop in the value indicated would be worrisome and cause him to repeat the measurement, which generally requires stopping of the vehicle.

An air pump according to the invention encircles the axis of the operating means, which is a push-button returned to its initial position by an elastic member and characterized in that thevalve for the valve the device to atmosphere is actuated by a rod which is coaxial with said pump operating means, and frictionally driven thereby so that the rod can slide in the actuating means once the valve has reached its closed or open position.

Preferably the extensible elastic membrane is a sleeve having two open ends which are sealingly attached about their peripheries. One end, which is of smaller diameter, is attached to the pump operating means and the other end is attached between the body of the pump and a separating wall defining the calibrated orifice, as well as a cover sealingly attached by the same joint to the pump body and to the separating wall to define therewith the volume of the second chamber.

According to another characteristic of the invention, the rod slidable in the operating means passes through the separating wall and carries at its end remote from the pushbutton a valve member which blocks an orifice in said cover leading to the atompshere when pressure is exerted on the pushbutton, and comes into abutment against the wall when this pressure ceases.

When used on an automotive vehicle the measuring instrument may advantageously comprise a manometric tube, the median plane of which is parallel to the direction in which the vehicle moves, said tube comprising a throttle in its lower part, and the part thereof which is invisible to the driver and positioned toward the front of the vehicle having a backwardly curved portion which is connected to the pneumatic circuit.

This prevents dynamic phenomena from affecting the measuring column, especially during braking, while taking up a minimum amount of space.

The invention will be better understood and its additional useful characteristics will appear more clearly from a reading of the following description of a preferred embodiment of the invention, with reference to the accompanying drawings, on which:

Figure 1:
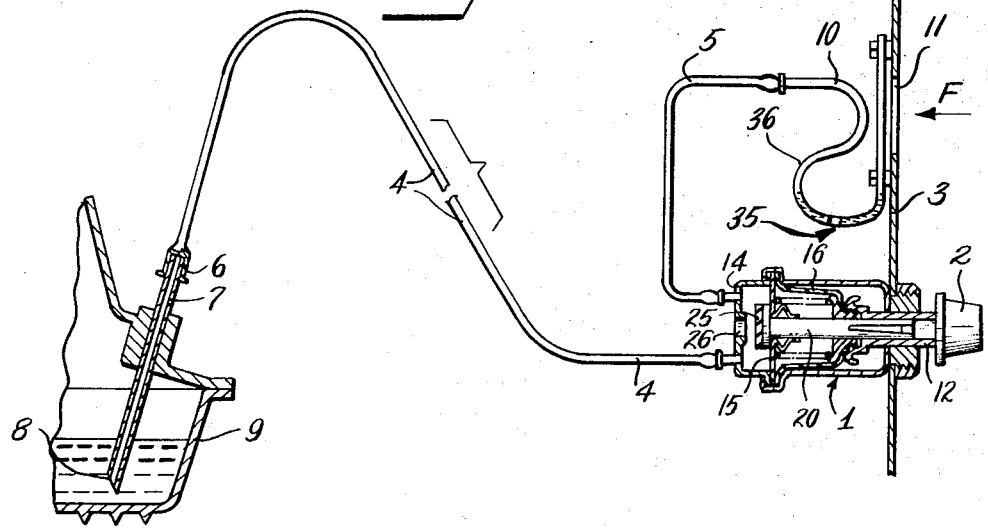
FIG. 1 is a schematic assembly view of the entire apparatus.

An air pump 1 actuated by a push-button 2 is mounted on the dashboard of a vehicle (schematically indicated by the sheet 3) near the driver's position. This pump supplies a pneumatic circuit comprising two flexible ducts 4, 5 (FIG. 1).

The duct 4 is connected to one end 6 of a descending tube 7, the other end 8 of which is bevelled and is immersed in the oil of the crankcase 9, the level of which is to be measured.

Figures 3, 4:
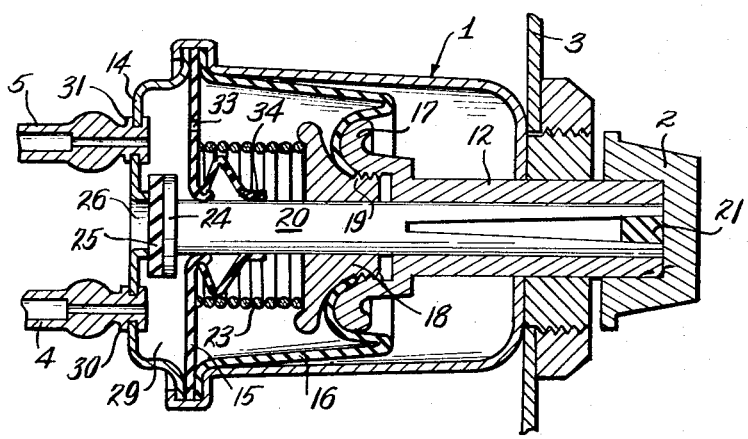
FIG. 3 is a sectional view taken through the pump in its operating position.
FIG. 4 is a view taken in the direction of the arrow F of FIG. 1 showing the dial of the measuring instrument.

The duct 5 is connected to one end of a manometric tube 10 positioned behind the dashboard 3 and visible to the driver through an opening 11 (FIG. 4). The substantially vertical median plane of the tube 10 is parallel to the direction of operation of the vehicle.

Figure 2:
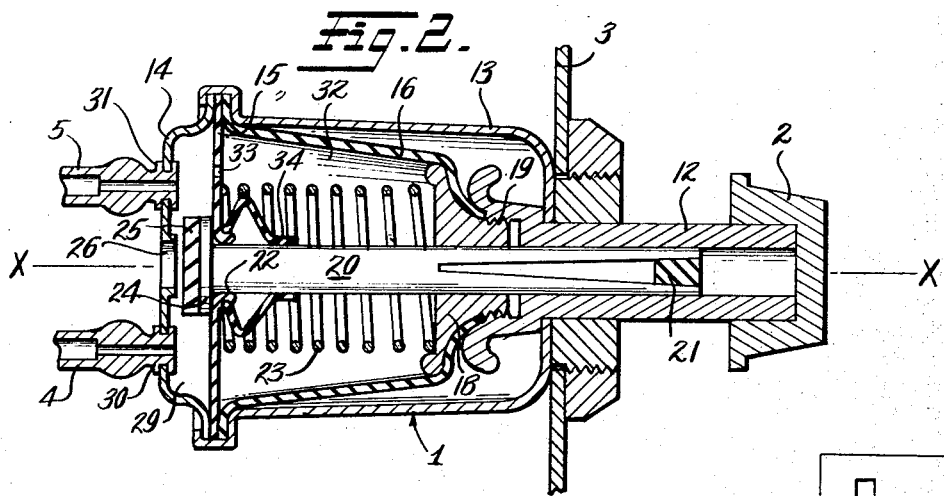
FIG. 2 is a sectional view taken through the pump in its rest position.

The pump 1 (FIG. 2) encircles the axis X—X of the operating member 12 manually actuated by the pushbutton 2. It comprises a pump 13 in the shape of a deep cup and a cover 14 crimped thereto and lying on the opposite side of a flat wall 15.

The thin elastic membrane 16 is generally frustoconical in shape and open at each end. The end of larger diameter carries an outwardly extending first ring whereas the other end carries a second ring extending inwardly of the space defined by the membrane.

The membrane is sealingly attached, on the one hand, to the body of the pump 13 by clamping the first ring between the wall 15 and said body during assembly of the cover and, on the other hand, to operating means 12 by clamping the second ring between said operating member and a sleeve 18 screwed into a threaded bore 19.

A cylindrical rod 20 is slidingly mounted in an axial bore in the operating member. The end of the rod 20 slides in the operating member and is provided with an axial slot. An elastic block 21 of rubber for example, spaces the two arms of the rod and biasses them into frictional contact with the inner wall of the operating member.

The rod 20 passes through a circular orifice 22 in the wall 15. A return spring 23 bears against the wall 15 and the sleeve 18. The end 24 of the rod 20 remote from the push button carries a valve member 25 which blocks an orifice 26 in the cover 14 when pressure is applied to the push-button and abuts against the wall 15 when this pressure is released.

The cover 14 and the wall 15 define a constant volume chamber 29 permanently connected to the ducts 4 and 5 connected to the spigots 30 and 31. The wall 15, the sleeve 18, and the membrane 16 define a variable volume chamber 32 connected to the chamber 29 by a calibrated orifice 33 in the wall 15. Finally, a sealing member 34 is provided where the rod 20 passes through the wall 15.

The pump operates in the following manner. When pressure is exerted on the button 2 the rod 20 is frictionally driven and closes the orifice 26. The operating member 12 continues along its path of travel sliding on the rod 20, and pressure is exerted on the elastic membrane 16 by the end 17 of the operating member 12, so that the membrane collapses thereagainst as shown in FIG. 3, the convex toroidal form of the end 17 being favorable to this action. Since the volume of the chamber 22 decreases, the pressure increases and a flow takes place through the calibrated orifice 33 and the constant volume chamber 29 toward the pneumatic measuring circuit. The more rapid the movement of the operating member the greater the increase in pressure inside the chamber 32, which results in a corresponding expansion of the flexible membrane. This expansion is practically zero if the action is very slow.

When movement of the operating member 12 is stopped by its abutment against the rod 20, the membrane 16 contracts and this prolongs for an instant the flow into the pneumatic circuit.

Regardless of the rapidity of the action on the button 2 a substantially constant flow of air through the calibrated orifice 33 takes place so that this orifice, in combination with the elastic membrane 16, constitutes a true flow regulator. This prevents the production of an excessive speed of air flow in the descending tube 7, which would lead to an excessive loss of air through the orifice 8, which would have the effect of causing a measurement which would underestimate the actual level of the liquid.

It is important that the circuit be connected to atmosphere when pressure on the push-button is released so that the liquid in the manometric tube is not sucked up. It has been seen that the plane of the manometric tube is parallel to a vertical longitudinal plane, which results in a minimum bulk. The throttle 35 in the lower horizontal part of the tube serves two purposes. It damps the oscillations of the column to facilitate reading of the measurement and it divides this column into two parts to avoid movement of the liquid in response to inertial forces, especially during braking, and thus cooperates with the part 36 on the tube 10 which is curved backwardly to prevent liquid from being driven in the tube 5 in the direction of the chamber 29. Finally, the beveled form of the end 8 of the tube 7 avoids the formation of excessively large bubbles and thus improves the precision of measurement.

The device thus far described operates in a simple, reliable manner and is particularly well adapted to the measurement of the level of the fluid in a reservoir on an automotive vehicle from a distance.

The invention is not, of course, limited to the details of the example which has been described, since this particular embodiment may be modified as to detail without thereby departing from the basic principles of the invention as defined by the following claims.

What is claimed is:

1. In a device for measuring the level of a liquid in a container, said device comprising a manometric measuring tube, a pneumatic circuit connected both to said tube and to said container beneath the level of liquid therein, and a flexible membrane mounted to force a gas into said circuit between said tube and container, the improvement which comprises a constant volume chamber connected both to said circuit and to atmosphere through separate orifices, a variable volume chamber the volume of which is dependent on the position of said membrane and which is in constant communication with said constant volume chamber, and operating means for flexing said membrane to reduce the volume of said variable volume chamber and thereby force gas into said constant volume chamber thence into said circuit, while simultaneously closing the orifice connecting said constant volume chamber to atmosphere.

2. Device as claimed in claim 1 in which said operating means comprises a drive member which is movable between a position closing the orifice leading to atmosphere and one leaving that orifice open, a driving member connected to flex said membrane, and friction means through which said driven member is actuated by movement of said driving member.

3. Device as claimed in claim 2 in which said driven member is biassed away from the orifice leading to atmosphere by a resilient member and fits telescopically into said driving member, with said driven member, sliding in said driving member after it has reached the limits of its path of travel.

4. Device as claimed in claim 3 in which the membrane is a frusto-conical sleeve open at its two ends the periphery of the smaller end being sealingly attached to the operating member and the periphery of the other end being sealingly attached between the body of the pump and a wall separating said constant volume chamber from said variable volume chamber.

5. An air pump comprising a constant volume chamber having an air vent and a separate air outlet, and a variable volume chamber separated from said constant volume chamber by a common wall defining an orifice connecting said chambers, a flexible diaphragm mounted to control the volume of said variable volume chamber, an operating member connected to move said diaphragm between a first position at which the volume of said variable volume chamber is at its maximum and a second position in which said volume is at its minimum, and a valve member frictionally driven by said operating member to close said air vent as operating member begins to move said diaphragm toward said second position.

6. An air pump as claimed in claim 6 in which said valve member is carried by a rod which passes through said wall and one end of said rod is telescopically received within said operating member.

7. An air pump as claimed in claim 6 in which said one end of said rod is divided into two prongs by an axial slit and resilient means within said slit biasses said prongs outwardly against said operating member to provide said friction drive.

8. In combination, an air pump as claimed in claim 5 and a device for measuring the level of a liquid in a container, said device comprising a manometric measuring tube, and a pneumatic circuit connected both to said tube and to said container beneath the level of the liquid in said container, said air outlet being connected to said circuit between said tube and container.

9. In a device for measuring the level of a liquid in a container located in a vehicle, said device comprising a manometric measuring tube, a pneumatic circuit connected to both said tube and to said container beneath the level of liquid therein, and a flexible membrane mounted to force a gas into said circuit between said tube and container, the improvement according to which the median plane of the manometric tube is parallel to the direction of movement of the vehicle, said tube comprises a generally horizontal lower middle portion containing a throttle, a first upper end portion positioned to be seen by the driver of the vehicle, and a second upper end portion which is S-curved and then connected to the pneumatic circuit, and said device further comprises a constant volume chamber connected both to said circuit and to atmosphere through separate orifices, a variable volume chamber the volume of which is dependent on the position of said membrane and which is in constant communication with said constant volume chamber, and operating means for flexing said membrane to reduce the volume of said variable volume chamber and thereby force gas into said constant volume chamber and thence into said circuit, while simultaneously closing the orifice connecting said constant volume chamber to atmosphere.

* * * * *